(12) United States Patent
Nagai et al.

(10) Patent No.: US 9,977,164 B2
(45) Date of Patent: May 22, 2018

(54) OPTICAL MEMBER AND IMAGE DISPLAY DEVICE HAVING OPTICAL MEMBER

(71) Applicant: FUJIFILM Corporation, Tokyo (JP)

(72) Inventors: Michio Nagai, Kanagawa (JP); Yoji Ito, Kanagawa (JP); Daisuke Kashiwagi, Kanagawa (JP); Akira Yamamoto, Kanagawa (JP); Nobuhiko Ichihara, Kanagawa (JP); Hideyuki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 14/963,928

(22) Filed: Dec. 9, 2015

(65) Prior Publication Data

US 2016/0170111 A1    Jun. 16, 2016

(30) Foreign Application Priority Data

Dec. 11, 2014   (JP) .................. 2014-251209

(51) Int. Cl.
*G02B 5/30* (2006.01)
*G06F 3/042* (2006.01)
*G06F 3/03* (2006.01)
*G06F 3/0354* (2013.01)

(52) U.S. Cl.
CPC ......... *G02B 5/3016* (2013.01); *G06F 3/0317* (2013.01); *G06F 3/03542* (2013.01); *G06F 3/0421* (2013.01)

(58) Field of Classification Search
CPC ............................ G02B 5/3016; G02F 3/0421
See application file for complete search history.

(56) References Cited

U.S. PATENT DOCUMENTS

| 8,993,100 | B2 | 3/2015 | Sekine et al. |
| 2007/0216518 | A1* | 9/2007 | Hoffmuller ............ G07D 7/122 340/5.85 |
| 2008/0182041 | A1* | 7/2008 | Sekine ................. G02B 5/3016 428/29 |
| 2008/0233360 | A1 | 9/2008 | Sekine et al. |
| 2011/0181820 | A1 | 7/2011 | Watanabe |

FOREIGN PATENT DOCUMENTS

| JP | 2008-165385 A | 7/2008 |
| JP | 2011-154215 A | 8/2011 |

* cited by examiner

*Primary Examiner* — Kendrick Hsu
(74) *Attorney, Agent, or Firm* — Edwards Neils LLC; Jean C. Edwards, Esq.

(57) ABSTRACT

The present invention provides an optical member having a substrate and a dot in contact with a surface of the substrate, wherein the dot is made of a liquid crystal material having a cholesteric structure; the dot has wavelength selective reflection property; and the dot reflects both the right circularly polarized light and the left circularly polarized light at a wavelength at which the dot exhibits the wavelength selective reflection property. The present invention also provides an image display device having the above optical member. The optical member of the present invention achieves a large intensity of reflected light from the dot in the optical member, and the image display device of the present invention has favorable data input sensitivity as an image display device capable of receiving data input.

20 Claims, 1 Drawing Sheet

OPTICAL MEMBER AND IMAGE DISPLAY DEVICE HAVING OPTICAL MEMBER

CROSS-REFERENCE TO RELATED APPLICATIONS

This application claims priority under 35 U.S.C 119 to Japanese Patent Application No. 2014-251209 filed on Dec. 11, 2014. The above application is hereby expressly incorporated by reference, in its entirety.

BACKGROUND OF THE INVENTION

Field of the Invention

The present invention relates to an optical member and an image display device having the optical member.

Background Art

Demand for a system in which data is input by handwriting on a display of an image display device by using an electronic pen or the like has increased in recent years. Patent Literature 1 discloses a transparent sheet on which a dot pattern made of transparent ink containing a liquid crystal material having a cholesteric structure selectively reflecting infrared rays is printed on a transparent substrate. This transparent sheet is attached to a display device and can be used for the above-described system in combination with the electronic pen including an infrared sensor for detecting reflected light from the dot pattern and an infrared irradiation portion.

Patent Literature 1: Japanese Patent Laid-Open No. 2008-165385

Patent Literature 2: Japanese Patent Laid-Open No. 2011-154215

SUMMARY OF INVENTION

A dot in the dot pattern disclosed in Patent Literature 1 is as small as a diameter of 100 μm. In addition, in the future, much finer dot patterns are also considered to be in demand for finer handwriting data input. Therefore, in order to sufficiently detect reflected light from each dot by the sensor in the electronic pen, an intensity of reflected light of each dot is desirably larger. In Patent Literature 1, an inclination angle formed by a helical axis direction of the cholesteric structure and a normal line of a surface of the transparent substrate is distributed within a range of at least 0 to 45 degrees, and thus an infrared reflection pattern-printed transparent sheet having a wide reading angle can be formed. However, the structure in which the inclination angle is distributed as described above merely scatters the light and does not increase the intensity of the reflected light.

An object of the present invention is to provide an optical member having a large intensity of reflected light from the dot in the optical member having the dots made of a reflecting material on a substrate. The present invention also has an object to provide an image display device having favorable data input sensitivity as an image display device capable of receiving data input.

When a liquid crystal material having the cholesteric structure is used as the reflecting member, this liquid crystal material has a circularly polarization selective reflection property in which only either of the right circularly polarized light or the left circularly polarized light is reflected, and thus a reflectivity at a specific wavelength of the dot becomes 50% or less at the maximum. Namely, the circularly polarized light which has not been reflected is transmitted and lost. In the paragraph [0011] in Patent Literature 1, it is disclosed that the circularly polarization selective reflection of reflecting only either of the right circularly polarized light or the left circularly polarized light is utilized, detection is made by combining circularly polarization filters, and thus an SN ratio between reflected light from the cholesteric structure and background light is improved. However, this is only improvement of the SN ratio and does not increase absolute intensity of the reflected light from the cholesteric structure. Therefore, the inventors have attempted to form a dot pattern which reflects both the right circularly polarized light and the left circularly polarized light by using a liquid crystal material having the cholesteric structure, and have completed the present invention.

Regarding the liquid crystal material having the cholesteric structure which reflects both the right circularly polarized light and the left circularly polarized light, for example, Patent Literature 2 and the like disclose an infrared light reflecting plate including a layer reflecting the right circularly polarized light and a layer reflecting the left circularly polarized light. However, formation of the liquid crystal material having the dot-shaped cholesteric structure has many technical differences from formation of a layer (film) made of a liquid crystal material having the cholesteric structure from the viewpoint of control of alignment or the like of liquid crystal molecules, and the method according to Patent Literature 2 cannot be applied as it is. In addition, an optical member having a dot reflecting both the right circularly polarized light and the left circularly polarized light has not been known until the present application is filed.

The present invention thus provides the following [1] to [14].

[1] An optical member, having a substrate and a dot in contact with a surface of the substrate, wherein
the dot is made of a liquid crystal material having a cholesteric structure;
the dot has wavelength selective reflection property; and
the dot reflects both the right circularly polarized light and the left circularly polarized light at a wavelength at which the dot exhibits the wavelength selective reflection property.

[2] The optical member described in [1], wherein
the dot reflects both the right circularly polarized light and the left circularly polarized light to both incident light with an angle relative to a normal line of the substrate of 0 degrees and incident light with an angle relative to the normal line of the substrate of 27 degrees.

[3] The optical member described in [1] or [2] including a cholesteric structure with a right helical twist direction and a cholesteric structure with a left helical twist direction.

[4] The optical member described in [3], wherein
the dot includes a portion including the cholesteric structure with the right helical twist direction and the cholesteric structure with the left helical twist direction, in a layered state in this order, from the substrate side in a direction of the normal line of the substrate, the substrate and the cholesteric structure with the right helical twist direction are in direct contact with each other, and the cholesteric structure with the right helical twist direction and the cholesteric structure with the left helical twist direction are in direct contact with each other.

[5] The optical member described in any one of [1] to [4], having a plurality of the dots in a patterned manner on the surface of the substrate.

[6] The optical member described in any one of [1] to [5], wherein
a diameter of the dot is 20 to 200 μm.

[7] The optical member described in any one of [1] to [5], wherein
a diameter of the dot is 70 to 150 μm.

[8] The optical member described in any one of [1] to [7], wherein
a value obtained by dividing a maximum height of the dot by the diameter of the dot is 0.16 to 0.30.

[9] The optical member described in any one of [l] to [8], wherein
an angle formed by a surface of the dot and the substrate is 33 to 62 degrees on an edge portion of the dot.

[10] The optical member described in any one of [1] to [9], wherein
the liquid crystal material is a material obtained by curing a liquid crystal composition containing a liquid crystal compound and a chiral agent.

[11] The optical member described in any one of [1] to [10], wherein
the dot has a wavelength selective reflection property having a central wavelength in an infrared light region.

[12] The optical member described in [11], wherein
the dot has a wavelength selective reflection property having a central wavelength in a wavelength of 800 to 950 nm.

[13] The optical member described in any one of [1] to [12], which is transparent.

[14] An image display device having the optical member described in [13].

Effect of the Invention

A novel optical member is provided by the present invention. The optical member of the present invention can be used as an optical member for data input by handwriting with an electronic pen or the like on a display by being attached to, for example, a display of the image display device. Sensitivity in data input can be increased through the utilization of the optical member of the present invention.

MODES OF CARRYING OUT INVENTION

Hereinafter, the present invention will be described in detail.

In the present description, the term "to" is used in the sense that numeric values described before and after the same are included as the lower limit and the upper limit.

In the present description, for example, angles such as "45°", "parallel", "perpendicular" or "orthogonal" mean, unless otherwise described in particular, that the difference from a strict angle is in a range of less than 5 degrees. The difference from a strict angle is preferably less than 4 degrees, more preferably less than 3 degrees.

In the present description, "(meth)acrylate" is used in the sense of "either one of or both of acrylate and methacrylate."

In the present description, each numerical value, a numerical value range, and qualitative expression (for example, expression such as "the same") are interpreted as indicating the numerical value, the numerical value range, and the nature including generally allowed errors in this technical field. Particularly, in the present description, when the term such as "all", "any one of" or "whole surface" is used, the term includes an error range generally allowed in the technical field in addition to the case of 100% and includes, for example, 99% or more, 95% or more, or 90% or more.

Visible light is light of a wavelength that can be seen by human eyes in electromagnetic waves and refers to light in a wavelength region of 380 to 780 nm. Non-visible light is light in a wavelength region less than 380 nm or a wavelength region exceeding 780 nm.

In infrared light, near infrared light is an electromagnetic wave in a wavelength region of 780 to 2500 nm. Ultraviolet light is light within a range of the wavelength from 10 to 380 nm.

In the present description, retroreflection means reflection in which incident light is reflected in an incident direction.

In the present description, the term "polar angle" means an angle to the normal line of the substrate.

In the present description, a surface of the dot means a surface or an interface of the dot on a side opposite to the substrate and means a surface not in contact with the substrate. Note that contact of the surface of the dot with the substrate on an edge portion of the dot should not be precluded.

When the term transparent is used in the present description, specifically, a light transmittance value may be 50% or more or 70% or more, or a light transmittance value is preferably 85% or more. The light transmittance value is a visible light transmittance value acquired by a method described in JIS A5759. Namely, a transmittance of 380 to 780 nm is measured by a spectrophotometer and the visible light transmittance is acquired as weighed average, by multiplying the transmittance with a weighting factor obtained from wavelength distribution and wavelength interval of CIE (International Commission on Illumination) Daylight, Spectral Distribution of D65, CIE Standard Photopic Luminosity Function.

In the present description, the term "haze" means a value measured by using a hazemeter NDH-2000 by Nippon Denshoku Industries Co., Ltd.

Theoretically, the haze means a value represented by the following expression:

(Scattering transmittance value of natural light from 380 to 780 nm)/(Scattering transmittance value of natural light from 380 to 780 nm+parallel light transmittance value of natural light)×100%

The scattering transmittance value is a value that can be calculated by subtracting the parallel light transmittance value from the omnidirectional transmittance value obtained by using the spectrophotometer and an integrating sphere unit. The parallel light transmittance value is a transmittance value at 0 degrees if it is based on a value measured by using the integrating sphere unit.

<Optical Member>

An optical member includes a substrate and a dot formed on the surface thereof, that is, a dot in contact with the substrate surface. The dot in contact with the substrate surface is a dot in direct contact with the substrate surface.

Figure 1:
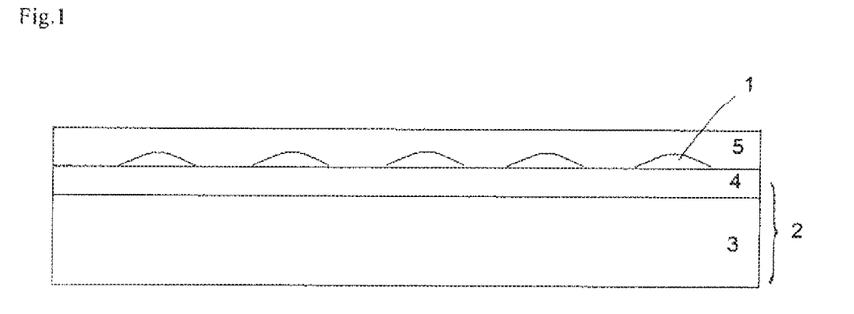
FIG. 1 is a view schematically illustrating a cross-sectional view of an example of an optical member of the present invention.

A shape of the optical member is not particularly limited, and the shape may be, for example, a film-shape, a sheet-shape, or a plate-shape. FIG. 1 schematically illustrates a cross-sectional view of an example of the optical member of the present invention. In this example, a dot 1 is in contact with the surface on a base layer side of the substrate 2 formed of a support 3 and the base layer 4, and moreover, an overcoat layer 5 is provided on a dot forming surface side of the substrate so as to cover the dot 1.

The optical member of the present invention may be transparent or may not be transparent in a visible light region in accordance with the use, but the member is preferably transparent.

The haze of the optical member of the present invention is preferably 5% or less, more preferably 3% or less, and particularly preferably 2% or less.

<Substrate>

The substrate included in the optical member of the present invention functions as a base material for forming the dot on the surface.

The substrate preferably has a low light reflectance at a wavelength at which the dot reflects light and preferably does not include a material which reflects the light at the wavelength at which the dot reflects the light.

In addition, the substrate is preferably transparent in the visible light region. Furthermore, the substrate may be colored but is preferably not colored or less colored. Moreover, the substrate preferably has a refractive index of approximately 1.2 to 2.0, more preferably approximately 1.4 to 1.8. These are all for the purpose of not lowering visibility of an image displayed on a display when the optical member is used for an application, for example, on a front surface of the display.

A thickness of the substrate may be selected in accordance with the use and is not particularly limited and may be approximately 5 to 1000 μm, preferably 10 to 250 μm, and more preferably 15 to 150 μm.

The substrate may have a single layer or multiple layers. Examples of the substrate in the case of a single layer include glass, triacetylcellulose (TAC), polyethyleneterephthalate (PET), polycarbonate, polyvinyl chloride, acryl, polyolefin and the like. Examples of the substrate in the case of the multiple layers include a substrate or the like obtained by including any one of the examples of the substrate in the case of the single layer as a support and by providing another layer on the surface of the support.

An example of the another layer includes a base layer provided between the support and the dot. The base layer is preferably a resin layer and particularly preferably a transparent resin layer. Examples of the base layer include a layer for adjusting a surface shape when a dot is formed, a layer for improving adhesion characteristics to the dot, an alignment layer for adjusting alignment of a polymerizable liquid crystal compound when a dot is formed, and the like. Furthermore, the base layer has preferably a low light reflectance at a wavelength at which the dot reflects light and preferably does not contain a material which reflects light at a wavelength at which the dot reflects light. In addition, the base layer is preferably transparent. Moreover, the base layer has preferably a refractive index of approximately 1.2 to 2.0, more preferably approximately 1.4 to 1.8. The base layer is also preferably a thermosetting resin or a photosetting resin obtained by curing a composition containing a polymerizable compound directly applied to the surface of the support. Examples of the polymerizable compound include non-liquid crystalline compounds such as (meth)acrylate monomer, urethane monomer and the like.

A thickness of the base layer is not particularly limited, but is preferably 0.01 to 50 μm, and more preferably 0.05 to 20 μm.

The substrate surface or the base layer may be subjected to surface processing before dot formation. A hydrophilization treatment or formation of an irregular shape may be performed, for example, for formation of a dot having a desired shape or for formation of a desired dot pattern.

<Dot>

The optical member of the present invention includes a dot in contact with the substrate surface. The substrate surface on which the dot is formed may be both surfaces or one surface of the substrate, but is preferably one surface.

One or two or more dots may be formed on the substrate surface. Two or more dots may be formed in large numbers close to each other on the substrate surface, and a total surface area of the dots may be 50% or more, 60% or more, 70% or more and the like of an area of a dot formation side surface of the substrate. In such a case, optical characteristics such as selective reflection property of the dot may be the optical characteristics of substantially the entire optical member, particularly the optical characteristics of the whole surface of the dot formation surface. On the other hand, the two or more dots may be formed in large numbers away from each other on the substrate surface, and the total surface area of the dots may be less than 50%, 30% or less, 10% or less and the like of the area of the dot formation side surface of the substrate. In such a case, the optical characteristics of the optical member on the dot formation surface side may be characteristics that can be confirmed as contrast between the optical characteristics of the substrate and the optical characteristics of the dot.

A plurality of dots may be formed in a patterned manner and may have a function of presenting information. By forming the optical member so that positional information in the optical member formed in a sheet shape can be provided, for example, the optical member can be used as a sheet capable of receiving data input by being attached to the display.

When the dots are formed in a patterned manner and a plurality of dots each having a diameter of, for example, 20 to 200 μm is formed, 10 to 100, preferably 15 to 50, and more preferably 20 to 40 dots on average may be included per square of 2 mm by 2 mm on the substrate surface.

When a plurality of dots exists on the substrate surface, the diameter and the shape of the dots may be all the same or different ones may be included, but the shape of the dots are preferably all the same in order to obtain uniform reflected light from each of the dots. For example, the dots are preferably formed under the same condition, with the intention of forming dots having the same diameter and shape.

In the present description, when the dots are described, the description is applied to all the dots in the optical member of the present invention but the optical member of the present invention including the described dots is allowed to include dots not applicable to the description due to errors that are allowed in this technical field.

[Shape of Dot]

The shape of the dot is not particularly limited, but is preferably circular when seen from the normal direction of the substrate. The circle does not have to be a perfect circle, but may be a substantial circle or an ellipse. For example, the circle may be a shape in which a plurality of circles is slightly shifted and overlapped with each other. When a center is referred to regarding the dot, the center means a center of this circular shape or the center of gravity. When a plurality of dots exists on the substrate surface, the dot shape may be the same or different, but the dot shape is preferably the same or at least similar to each other.

The dot preferably has a diameter of 20 to 200 µm, more preferably 70 to 150 µm. When the dot is not a circle, the diameter of the dot is approximated to a circle and measured or calculated.

The diameter of the dot can be obtained by measuring a length of a straight line which is a straight line from one edge portion (a border or a boundary portion of the dot) to another edge portion and which passes through the center of the dot, in an image obtained by a microscope such as a laser microscope, a scanning electron microscope (SEM), a transmission electron microscope (TEM) or the like. Note that the number of dots and an inter-dot distance can be also determined by a microscopic image taken by the laser microscope, the scanning electron microscope (SEM), the transmission electron microscope (TEM) or the like.

The dot preferably includes a portion having a height continuously increasing from the edge portion of the dot to the maximum height in a direction toward the center. In the present description, the portion is referred to as an inclined portion or a curved portion in some cases. Namely, the dot preferably includes the inclined portion or the curved portion or the like whose height increases from the edge portion of the dot toward the center.

Note that, in the present description, the term "height" regarding the dot means a "shortest distance from a point on the surface of the dot to the surface on the dot formation side of the substrate". In addition, when the substrate has irregularity, extension of the substrate surface at the edge portion of the dot is assumed to be the dot formation side surface. The maximum height is the maximum value of the height, which is, for example, the shortest distance from the apex of the dot to the dot formation side surface of the substrate. The height of the dot can be determined by a focal position scanning by the laser microscope or a dot cross-sectional view obtained by using the microscope such as SEM or TEM.

Examples of the structure including the inclined portion or the curved portion include a semispherical shape obtained by defining the substrate side as a plane surface, a shape in which an upper part of this semispherical shape is cut out substantially in parallel with the substrate to thereby be leveled (spherical trapezoidal shape), a conical shape obtained by defining the substrate side as a bottom surface, a shape in which the upper part of this conical shape is cut out substantially in parallel with the substrate to thereby be leveled (truncated conical shape), a shape approximated to any of them, and the like. Among them, the semispherical shape obtained by defining the substrate side as a plane surface, the shape in which an upper part of this semispherical shape is cut out substantially in parallel with the substrate to thereby be leveled, the shape in which the upper part of the conical shape obtained by defining the substrate side as a bottom surface is cut out substantially in parallel with the substrate to thereby be leveled, and the shape that can be approximated to any of them are preferable. Note that the semispherical shape includes not only the semispherical shape obtained by defining a surface including the center of the sphere as a plane surface, but also any of the spherical segment shapes obtained by arbitrarily cutting out a sphere into two parts.

A point on the dot surface giving the maximum height of the dot may be at the apex of the semispherical or conical shape or on a surface cut out substantially in parallel with the substrate to thereby be leveled as described above. It is preferable that all the points on the leveled plane also give the maximum height of the dot. It is also preferable that the center of the dot gives the maximum height.

As to the dot, a value obtained by dividing the maximum height by the dot diameter (maximum height/diameter) is preferably 0.16 to 0.30. The above-described numerical value is preferably satisfied, particularly, in the semispherical shape obtained by defining the substrate side as a plane surface, the shape in which the upper part of this semispherical shape is cut out substantially in parallel with the substrate to thereby be leveled, and the shape in which the upper part of the conical shape obtained by defining the substrate side as a bottom surface is cut out substantially in parallel with the substrate to thereby be leveled, which are the shapes in each of which the dot height continuously increases from the edge portion of the dot to become the maximum height, and the maximum height is obtained at the center of the dot. The maximum height/diameter is more preferably 0.18 to 0.28.

Furthermore, an angle (an average value, for example) formed by the dot surface and the above-described substrate (dot formation side surface of the substrate) is preferably 33 to 62 degrees, more preferably 35 to 60 degrees. With such an angle, the dot can exhibit high retroreflection property at an incident angle of the light suitable for uses of the optical member which will be described later.

The above-described angle can be determined by focal position scanning by the laser microscope or from a cross-sectional view of the dot obtained by using the microscope such as SEM or TEM. In the present description, the above-described angle is obtained by measuring an angle of a contact portion between the substrate and the dot surface in the SEM image of the cross-sectional view of a dot on a surface including the dot center and perpendicular to the substrate.

[Optical Natures of Dot]

The dot in the optical member of the present invention has a wavelength selective reflection property and reflects both of the right circularly polarized light and the left circularly polarized light at a wavelength at which the wavelength selective reflection property is observed.

The dot in the optical member of the present invention reflects both the right circularly polarized light and the left circularly polarized light, and thus the dot has better reflection efficiency to radiated light (usually, natural light (non-polarized light)) and can give stronger reflected light under the same condition.

The light to which the dot exhibits selective reflection property is not particularly limited and the light may be any of infrared rays, visible rays, ultraviolet rays and the like. For example, when the optical member is bonded to a display and used as the optical member for data input by direct handwriting on a display device, the wavelength of the light to which the dot exhibits selective reflection property is preferably a wavelength in a non-visible light region so that a display image is not influenced, more preferably a wavelength in an infrared light region, and particularly preferably a wavelength in a near infrared light region. For example, it is preferable that a reflection wavelength band having a center wavelength in a range of 750 to 2000 nm, preferably in a range of 800 to 1500 nm is observed in a reflection spectrum from the dot. The above-described reflection wavelength is also preferably selected in accordance with the wavelength of the light radiated from the light source used in a combined manner or the wavelength of the light sensed by an imaging element (sensor).

The dot is preferably transparent in the visible light region. In addition, the dot may be colored, but is preferably not colored or less colored. These are for the purpose of not lowering visibility of an image displayed on a display when the optical member is used on the front surface of the display, for example.

[Cholesteric Structure]

A dot is formed from a liquid crystal material having cholesteric structure.

The cholesteric structure is known to exhibit selective reflection. The central wavelength λ of the selective reflection (reflection peak wavelength) depends on a pitch P of the helical structure (=helical period) in the cholesteric structure, and follows a relation of λ=n×P, n being an average refractive index of the cholesteric liquid crystal. Thus, the wavelength of selective reflection can be adjusted by adjusting the pitch of a helical structure. The pitch of a cholesteric structure depends on the type or addition amount of a chiral agent to be used together with the polymerizable liquid crystal compound for the formation of dots, and thus an intended pitch can be obtained by adjusting these.

For adjustment of pitch, FUJIFILM RESEARCH & DEVELOPMENT No. 50 (2005) pages 60 to 63 has a detailed description. For a method for measuring a helical twist direction or pitch, methods described in "Easy Steps in Liquid Crystal Chemistry Experiment" p 46, edited by The Japanese Liquid Crystal Society, Sigma Publishing, published in 2007, or "Liquid Crystal Handbook" p 196, Editorial Committee of Liquid Crystal Handbook, Maruzen can be used.

The cholesteric structure is observed as a stripe pattern of bright and dark parts in scanning electron microscope (SEM). Two repeats of bright and dark parts (two bright parts and two dark parts) correspond to one helical pitch. Therefore, a pitch can be measured from SEM cross-sectional view. The normal line of each line of the above stripe pattern represents a helical axis direction.

As to the half-width Δλ (nm) of a selective reflection zone (circularly polarized light reflection zone) in which selective reflection is observed, Δλ depends on birefringence Δn and pitch P of a liquid crystal compound, and follows the relation of Δλ=Δn×P. Consequently, the control of the width of a selective reflection zone can be performed by adjusting Δn. The adjustment of Δn can be performed by adjusting the type or mixing ratio of a polymerizable liquid crystal compound, or by controlling the temperature in fixing the alignment. The half-width of the reflection zone can be adjusted depending on the use of the optical member of the present invention, and can be, for example, 50 to 500 nm, and preferably 100 to 300 nm.

The selective reflection light from a cholesteric structure is circularly polarized light selective. The selective reflection light of one type of cholesteric structure becomes right circularly polarized light or left circularly polarized light. It depends on the helical twist direction of the cholesteric structure whether the light is right circularly-polarized light or left circularly-polarized light. When the helical twist direction of the cholesteric structure is right-handed, right-circularly polarized light is reflected, and when the helical twist direction of the cholesteric structure is left-handed, left-circularly polarized light is reflected. The helical twist direction of the cholesteric structure generally depends on the after mentioned chiral agent in the liquid crystal composition. By using a chiral agent that induces right helical twist direction, a cholesteric structure having a right helical twist direction can be prepared, and by using a chiral agent that induces left helical twist direction, a cholesteric structure having a left helical twist direction can be prepared.

A dot in the optical member of the present invention may include a cholesteric structure having a right helical twist direction and a cholesteric structure having a left helical twist direction. Although the dot may include the cholesteric structure having a right helical twist direction and the cholesteric structure having a left helical twist direction in any manner, the dot preferably includes a portion including the above two cholesteric structures in a layered state in the normal direction of a substrate, in order to obtain a structure that reflects both of right circularly polarized light and left circularly polarized light in at least the normal direction of a substrate. At the same time, each cholesteric structures may contain a helical axis that gives 40 to 0 degrees, preferably 30 to 0 degrees, more preferably 20 to 0 degrees to the normal direction of the substrate. An example of the above structure includes a structure where one cholesteric structure is positioned at a part that contacts the surface of the cholesteric structure dot and on the inward side the other cholesteric structure is positioned. The cholesteric structures having a right helical twist direction and the cholesteric structures having a left helical twist direction can be formed alternatively from the surface of the dot in a form of about 3 to 10 layers. The order of the structures is not particularly limited. However, the cholesteric structure positioned at a part that directly contacts the surface of the substrate is preferably a cholesteric structure having a right helical twist direction. The cholesteric structures having a right helical twist direction and the cholesteric structures having a left helical twist direction are preferably in direct contact between adjacent layers in the dot.

[Cholesteric Structure in a Dot]

In a dot, the angle of the helical axis of the cholesteric structure and the surface of the dot is preferably in a range of 50 degrees to 90 degrees. The angle is more preferably in a range of 60 degrees to 90 degrees, and still more preferably in a range of 70 degrees to 90 degrees. On the surface of a dot the angle of the helical axis of the cholesteric structure and the surface is preferably in a range of 70 degrees to 90 degrees.

When the cross section of a dot is observed with a scanning electron microscope (SEM), helical axis of the cholesteric structure is in the normal direction of the line of each dark part. On the surface of a dot, the angle of the helical axis of the cholesteric structure and the surface is an angle formed by the above surface and the normal line of the line of the first dark part from the dot surface. When the surface is curved, the angle can be obtained setting the surface as the tangent line to a surface in the above cross section. Particularly, by satisfying the above angle also in the above inclined portion or the curved portion, the dot can exhibit high retroreflection to the light entering the dot from a direction having a certain degrees relative to the normal direction of the substrate, and the dot can reflect both of right circularly polarized light and left circularly polarized light to the light entering the dot from a direction having a certain degrees relative to the normal direction of the substrate. For example, high retroreflection can be obtained and both of right circularly polarized light and left circularly polarized light can be reflected to the light entering the dot from a direction of polar angle of 27 degrees, preferably to the light entering the dot from a direction of polar angle of 45 degrees depending on the shape of the dot. Here, the polar angle of the light entering the dot represents a polar angle of the light directly before entering the dot and may be different from the polar angle of the light entering the outermost surface at the incident light side of the optical member when, for example, the optical member has an overcoat layer mentioned below. The optical member of the present invention can reflect both of right circularly polarized light and left circularly polarized light at a polar angle of at least 27 degrees or less, even without the overcoat layer.

The cholesteric structure can be obtained by fixing a liquid-crystalline phase. A structure in which a liquid-crystalline phase is fixed may be a structure in which the alignment of liquid crystal compounds in a cholesteric liquid-crystalline phase is maintained, and typically, may be a structure obtained by forming a layer having no flow property by putting a polymerizable liquid crystal compound into an alignment state of a cholesteric liquid-crystalline phase and then polymerizing and curing the same by ultraviolet ray irradiation, heating or the like, and, at the same time, may be a layer obtained by changing the same into a state where the alignment form is not changed by an external field or an external force. Note that, in the structure in which a liquid-crystalline phase is fixed, it is sufficient that the optical properties of the cholesteric liquid-crystalline phase are maintained in the layer, and the liquid crystalline compound in the layer does not need to exhibit liquid crystallinity any more. For example, the polymerizable liquid crystal compound may have already lost liquid crystallinity by being made into a polymer through a curing reaction.

[Liquid Crystal Composition]

A liquid crystal composition containing a liquid crystal compound and a chiral agent is an example of the material used to form the cholesteric structure. The liquid crystal compound is desirably a polymerizable liquid crystal compound.

The liquid crystal composition containing the polymerizable liquid crystal compound can further contain a surfactant and a polymerization initiator.

(Polymerizable Liquid Crystal Compound)

The polymerizable liquid crystal compound can be a rod-shaped or a disk-shaped liquid crystal compound. A rod-shaped liquid crystal compound is desirable.

Examples of rod-shaped polymerizable liquid crystal compounds that form cholesteric liquid crystal layers are rod-shaped nematic liquid crystal compounds. Rod-shaped nematic liquid crystal compounds in the form of azomethines, azoxys, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenyl pyrimidines, phenyl dioxanes, tolans, and alkenyl cyclohexylbenzonitriles are desirably employed. Not just low molecular weight liquid crystal compounds, but high molecular weight liquid crystal compounds can also be employed.

The polymerizable liquid crystal compound can be obtained by introducing a polymerizable group into a liquid crystal compound. Examples of polymerizable groups are unsaturated polymerizable groups, epoxy groups, and aziridinyl groups. Unsaturated polymerizable groups are desirable and ethylenic unsaturated polymerizable groups are particularly preferred. The polymerizable group can be incorporated into the molecule of the liquid crystal compound by various methods. The number of polymerizable groups present in the polymerizable liquid crystal compound is desirably 1 to 6, preferably 1 to 3. Examples of polymerizable liquid crystal compounds are included among the compounds described in Makromol. Chem., Vol. 190, p. 2255 (1989); Advance Materials, Vol. 5, p. 107 (1993); U.S. Pat. Nos. 4,683,327, 5,622,648, and 5,770,107; WO95/22586, WO95/24455, WO97/00600, WO98/23580, and WO98/52905; JP-A-Heisei Nos. 1-272551, 6-16616, 7-110469, and 11-80081; JP-A-Nos. 2001-328973, 2014-198815, 2014-198814; and the like. Two or more polymerizable liquid crystal compounds can be employed in combination. When employing two or more polymerizable liquid crystal compounds in combination, it is possible to lower the orientation temperature.

Specific examples of polymerizable liquid crystal compounds include the compounds denoted by formulas (1) to (11) described below.

(1)

(2)

(3)

(4)

(5)

(6)

-continued (7)

(8)

(9)

(10)

(11)

(In Compound 11, $X^1$ represents an integer of 2 to 5.)

Cyclic organopolysiloxane compounds and the like having a cholesteric phase such as those disclosed in JP-A-Showa No. 57-165480 can be employed as polymerizable liquid crystal compounds other than the above. High molecular weight liquid crystal compounds in the form of polymers in which mesogenic groups exhibiting liquid crystal properties are incorporated into the main chain, a side chain, or both the main chain and a side chain; high molecular weight cholesteric liquid crystal in which cholesteryl groups are incorporated into a side chain; the liquid crystal polymers disclosed in JP-A-Heisei No. 9-133810; liquid crystal polymers such as those disclosed in JP-A-Heisei No. 11-293252; and the like can be employed.

The quantity of the polymerizable liquid crystal compound that is added to the liquid crystal composition is desirably 75 to 99.9 weight %, preferably 80 to 99 weight %, and more preferably, 85 to 90 weight %, of the solid component weight (weight excluding solvent) of the liquid crystal composition.

[Chiral Agent (Optically Active Compound)]

The chiral agent functions to induce a helical structure in the cholesteric liquid-crystalline phase. Since different chiral compounds induce different helical twist directions or helical pitches, the chiral agent can be selected based on the objective.

The helical pitch induced by the chiral agent may be represented as HTP (Helical Twisting Power) as an index of the power of the chiral agent twisting the liquid crystal. The HTP can be calculated by using the equation: HTP=n/(λ× 0.01×C), from the selective wavelength (central wavelength of the selective reflection) λ, average refractive index n, and concentration of the chiral agent added C (weight %) of the cholesteric liquid crystal layer formed from a liquid crystal composition containing the chiral agent and a liquid crystal compound.

The chiral agent is not specifically limited. Known compounds (such as those described in the *Liquid Crystal Device Handbook*, Chapter 3, Section 4-3, TN and STN Chiral Agents, p. 199, comp. by the 142nd Committee of the Japan Society for the Promotion of Science, 1989), isosorbide, and isomannide derivatives can be employed.

The chiral agent usually contains asymmetric carbon atoms, however, planar asymmetric compounds or axial asymmetric compounds that do not contain asymmetric carbon atoms can also be employed as chiral agents. Examples of planar asymmetric compounds and axial asymmetric compounds are binaphthyl, helicene, paracyclophane, and derivatives thereof. The chiral agent can comprise a polymerizable group. When both the chiral agent and the liquid crystal compound comprise polymerizable groups, a polymerization reaction of the polymerizable chiral agent and polymerizable liquid crystal compound can be used to form a polymer comprising a repeating unit derived from the polymerizable liquid crystal compound and a repeating unit derived from the chiral agent. In this embodiment, the polymerizable group that is present in the polymerizable chiral agent is desirable a group of the same type as the polymerizable group that is present in the polymerizable liquid crystal compound. Accordingly, the polymerizable group of the chiral agent is desirably an unsaturated polymerizable group, epoxy group, or aziridinyl group, preferably an unsaturated polymerizable group, and more preferably, an ethylenic unsaturated polymerizable group.

The chiral agent can also be a liquid crystal compound. The compound denoted by formula (12) below is a specific example of a chiral agent.

(12)

In the formula, X denotes 2 to 5 (an integer).

In the liquid crystal composition, the content of the chiral agent is desirably 0.01 to 200 mol %, preferably 1 to 30 mol %, of the quantity of the polymerizable liquid crystal compound.

(Surfactant)

The liquid crystal composition can contain a surfactant. Examples of desirable surfactants are silicone surfactants and fluorine surfactants, with fluorine surfactants being preferred.

Specific examples of surfactants are the compounds described in JP-A-No. 2014-119605, paragraphs 0082 to 0090; the compounds described in JP-A-No. 2012-203237, paragraphs 0031 to 0034; the compounds given by way of example in JP-A-No. 2005-99248, paragraphs 0092 and 0093; the compounds given by way of example in JP-A-No. 2002-129162, paragraphs 0076 to 0078 and 0082 to 0085; and the fluorine (meth)acrylate polymer described in JP-A-No. 2007-272185, paragraphs 0018 to 0043.

A single surfactant can be employed alone, or two or more can be employed in combination.

The compound denoted by formula (I) below that is described in JP-A-No. 2014-119605, paragraphs 0082 to 0090, is particularly desirable as a fluorine surfactant.

In the liquid crystal composition, the quantity of surfactant added is desirably 0.01 to 10 weight %, preferably 0.01 to 5 weight %, and more preferably, 0.02 to 1 weight %, of the total weight of the polymerizable liquid crystal compound.

(Polymerization Initiator)

The liquid crystal composition desirably contains a polymerization initiator when it contains a polymerizable compound. In an embodiment in which the polymerization reaction is proceeded by UV irradiation, the polymerization initiator employed is desirably a photopolymerization initiator that is capable of starting a polymerization reaction when irradiated with UV radiation. Examples of photopolymerization initiators are α-carbonyl compounds (see the various description in U.S. Pat. Nos. 2,367,661 and 2,367,670); acyloin ether (described in U.S. Pat. No. 2,448,828); α-hydrocarbon-substituted aromatic acyloin compounds (described in U.S. Pat. No. 2,722,512); polynuclear quinone compounds (described in U.S. Pat. Nos. 3,046,127 and 2,951,758); combinations of triarylimidazole dimers and p-aminophenyl ketones (described in U.S. Pat. No. 3,549,367); acrylidine and phenazine compounds (described in JP-A-Showa No. 60-105667 and U.S. Pat. No. 4,239,850); and oxadiazole compounds (described in U.S. Pat. No. 4,212,970).

The content of photopolymerization initiator in the liquid crystal composition is desirably 0.1 to 20 weight %, preferably 0.5 to 12 weight %, of the content of polymerizable liquid crystal compound.

(Crosslinking Agent)

The liquid crystal composition can optionally contain a crosslinking agent to enhance the film strength following curing and to enhance durability. A crosslinking agent that is cured by UV radiation, heat, moisture, or the like can be suitably employed.

The crosslinking agent is not specifically limited and can be suitably selected based on the objective. Examples are trimethylol propane tri(meth)acrylate, pentaerythritol tri(meth)acrylate, and other multifunctional acrylate compounds; glycidyl (meth)acrylate, ethylene glycol diglycidyl ether, and other epoxy compounds; 2,2-bishydroxymethyl butanol-tris[3-(1-aziridinyl)propionate], 4,4-bis(ethyleneiminocarbonylamino)diphenylmethane, and other aziridine compounds; hexamethylene diisocyanate, biuret-type isocyanates, and other isocyanate compounds; polyoxazoline compounds having oxazoline groups in side chains; and vinyltrimethoxysilane, N-(2-aminoethyl)-3-aminopropyltrimethoxysilane, and other alkoxysilane compounds. Known catalysts can be employed based on the reactivity of the crosslinking agent, making it possible to enhance productivity in addition to enhancing film strength and durability. These can be employed singly or in combinations of two or more.

The content of the crosslinking agent is desirably 3 to 20 weight %, preferably 5 to 15 weight percent. When the content of the crosslinking agent is less than 3 weight %, an effect of enhancing crosslinking density is sometimes not achieved. When it exceeds 20 weight %, the stability of the cholesteric liquid crystal layer sometimes ends up dropping.

(Other Additives)

When the inkjet method described further below is employed as the method of forming dots, it is possible to employ a monofunctional polymerizable monomer to achieve the ink properties that are generally required. Examples of monofunctional polymerizable monomers are 2-methoxyethyl acrylate, isobutyl acrylate, isooctyl acrylate, isodecyl acrylate, and octyl/decyl acrylate.

It is possible to add polymerization inhibitors, oxidation inhibitors, UV radiation absorbing agents, photostabilizing agents, coloring materials, metal oxide microparticles, and the like as needed to the liquid crystal composition to the extent that the optical performance and the like are not compromised.

(Solvent)

The liquid crystal composition is desirably employed in the form of a liquid when forming the dots.

The liquid crystal composition can contain a solvent. The solvent is not specifically limited and can be suitably selected based on the objective. An organic solvent is desirably employed.

The organic solvent is not specifically limited and can be suitably selected based on the objective. Examples are ketones such as methyl ethyl ketone and methyl isobutyl ketone; alkyl halides; amides; sulfoxides; heterocyclic compounds; hydrocarbons; esters; and ethers. These can be employed singly or in combinations of two or more. Of these, when the environmental burden is taken into account, the ketones are particularly desirable. The above components such as monofunctional polymerizable monomers can also function as solvents.

[Dot Forming Method]

The dot can be formed on the substrate surface by applying the above-described liquid crystal composition on the substrate and by curing the composition as necessary after drying.

The application of the liquid crystal composition onto the substrate is preferably performed by droplet dropping. When a plurality of dots is to be applied onto the substrate, printing may be performed by using the liquid crystal composition as ink. A printing method is not particularly limited and an inkjet method, a gravure printing method, a flexographic printing method and the like can be used, but the inkjet method is particularly preferable. The dot pattern can be also formed by applying the known printing technologies.

(Droplet Dropping)

The droplet dropping which is particularly preferable as a method of application onto the substrate will be described below.

The droplet dropping is preferably performed twice or more per dot. By dropping droplets twice or more, the liquid crystal composition containing the chiral agents with mutually induced helical twist directions different from each other in a state of being separated from each other can be applied onto the substrate in order to form one dot. The second droplet dropping of the liquid crystal composition and the subsequent droplet dropping can be performed focusing on the position of the liquid crystal composition dropped immediately before, on the substrate.

The inventors have found that, when droplets are dropped again to the portion where the droplets of the liquid crystal composition have been already dropped when the dot is to be formed, the dot shape does not become larger in a similar shape than the shape previously formed, but the dot shape can easily increase in a height direction with respect to the size when seen from the normal direction of the substrate. When the height direction increases, a dot in which the cholesteric structures of two layers or more made of liquid crystal compositions different from each other are present in order from the surface can be obtained with a large maximum height, and the dot reflecting both the right circularly polarized light and the left circularly polarized light even with respect to the incident light with a large polar angle can be formed. Namely, the dot reflecting both the right circularly polarized light and the left circularly polarized light can be formed also with respect to the incident light with, for example, the polar angle of 27 degrees or 45 degrees as described above.

When the droplets of the liquid crystal composition in which the helical twist direction induced by the contained chiral agent is different from that of the liquid crystal composition dropped immediately before are dropped in the second or later droplet dropping, the liquid crystal composition having been already dropped is preferably dried before droplet dropping. In addition, when the liquid crystal composition contains polymerizable liquid crystal compound, the composition is more preferably dried and cured. The chiral agents inducing the twist direction different from each other thus become hard to be mixed, and offset of the effects as the chiral agents which make formation of the cholesteric structure impossible can be prevented. The liquid crystal composition dropped onto the surface of the liquid crystal composition after being cured tends to have favorable alignment of the liquid crystal compound molecules. From this point of view, the droplets of the liquid crystal composition containing the chiral agent that induces right helical twist direction, the helical twist direction of which can be more easily controlled, are preferably dropped onto the substrate surface first, and after this liquid crystal composition is dried and cured, the droplets of the liquid crystal composition containing the chiral agent that induces left helical twist direction is preferably dropped onto the surface thereof.

The number of droplet dropping times for forming one dot may be twice or more, preferably 2 to 200 times, more preferably 2 to 100 times, still more preferably 2 to 80 times, and particularly preferably 2 to 50 times.

When droplets are dropped three times or more, droplet dropping of the liquid crystal composition with the same composition may be repeated. When the droplets of the liquid crystal composition with the same composition as that of the liquid crystal composition dropped immediately before are to be dropped, the droplet dropping may be performed before or after drying of the liquid crystal composition dropped immediately before. Furthermore, when the liquid crystal composition contains a polymerizable liquid crystal compound, the droplet dropping may be performed before or after curing of the liquid crystal composition dropped immediately before.

The following can be exemplified as a procedure of dot formation when the liquid crystal composition containing a polymerizable liquid crystal compound is used. In the following, liquid crystal composition 1 and liquid crystal composition 2 are liquid crystal compositions containing chiral agents that induce helical twist directions different from each other.

First Example (1) Droplets of the liquid crystal composition 1 are dropped onto the substrate 1 to 20 times not including drying and curing processes.
(2) The dropped droplets of the liquid crystal composition 1 are dried.
(3) Droplets of the liquid crystal composition 2 different from the liquid crystal composition 1 are dropped 1 to 100 times.
(4) The dropped droplets of the liquid crystal composition 2 are dried, and the entire liquid crystal composition 1 and liquid crystal composition 2 are cured.

Second Example (1) Droplets of the liquid crystal composition 1 are dropped onto the substrate 1 to 20 times not including drying and curing processes.
(2) The dropped droplets of the liquid crystal composition 1 are dried and cured.
(3) Droplets of the liquid crystal composition 2 different from the liquid crystal composition 1 are dropped 1 to 100 times.
(4) The dropped droplets of the liquid crystal composition 2 are dried and cured.

In the first and second examples above, the number of droplet dropping times of the liquid crystal composition 2 may be, for example, 3 to 8 times the number of droplet dropping times of the liquid crystal composition 1, and may be approximately 5 times.

Either one of the above-described first to second examples may be repeated twice or more, or any two or more selected from a group consisting of the above-described first to second examples may be combined.

In the above-described examples, the droplets of the liquid crystal composition 1 dropped onto the substrate surface preferably include the chiral agent that induces right helical twist direction, and the droplets of the liquid crystal composition 2 dropped preferably include the chiral agent that induces left helical twist direction.

In the liquid crystal composition 1 and the liquid crystal composition 2, types or concentrations of the liquid crystal compounds may be the same or different.

A known alignment method in the printing technology field can be applied to a technology of dropping droplets of the liquid crystal composition to the same position for the second time and the subsequent times, with respect to the position or position pattern of the liquid crystal composition previously dropped.

A liquid crystal composition amount (ink amount) per one time of droplet dropping may be, for example, 1 to 20 pL per dot, preferably 2 to 10 pL, and more preferably 5 to 6 pL. A total amount of the liquid crystal composition to be dropped per dot is, for example, 2 to 1200 pL, preferably 10 to 600 pL, more preferably 50 to 500 pL, and still more preferably 100 to 400 pL.

(Drying Liquid Crystal Composition)

The liquid crystal composition applied on the substrate can be dried as necessary. For drying or after drying, heating can be conducted. Liquid crystal compounds in the liquid crystal composition can be aligned during the drying or heating to form cholesteric liquid-crystalline phase. When heating is conducted, the heating temperature is preferably 200° C. or less, more preferably 130° C. or less.

When a plural of dryings is conducted in the course of forming a dot, the conditions for the dryings may be the same or different.

(Curing Liquid Crystal Composition)

When the liquid crystal composition contains polymerizable liquid crystal compound, the aligned liquid crystal compound may be further polymerized by curing the liquid crystal composition. The curing can be conducted either by light irradiation, or by heating, and curing by light irradiation is preferable. Ultraviolet rays are preferably used for light irradiation. Irradiation energy is preferably 20 mJ/cm$^2$ to 50 J/cm$^2$, more preferably 100 mJ/cm$^2$ to 1,500 mJ/cm$^2$. In order to accelerate the photo polymerization reaction, the light irradiation may be performed under heating conditions or under a nitrogen atmosphere. The wavelength of irradiated ultraviolet ray is preferably 250 nm to 430 nm. As to a polymerization reaction ratio, the higher one is preferable from the viewpoint of stability, 70% or more is preferable, and 80% or more is more preferable. The polymerization reaction ratio can be determined by measuring the consumed ratio of polymerizable functional groups through the use of an IR absorption spectrum.

When a plural of curing is conducted in the course of forming a dot, the conditions for the curings may be the same or different.

<Overcoat Layer>

The optical member may include an overcoat layer. The overcoat layer may be provided on a surface on which the dot of the substrate is formed, that is, on a surface side with which the dot is brought into contact, and the surface of the optical member is preferably leveled.

The overcoat layer is not particularly limited but is preferably a resin layer with the refractive index of approximately 1.4 to 1.8. In order to avoid scattering of image light form the image display device when the optical member is used as an input medium such as an input sheet on the display surface such as the image display device, a difference in the refractive index between the overcoat layer and the dot formed of the liquid crystal material is preferably 0.2 or less. The difference is more preferably 0.1 or less. The refractive index of the dot formed of the liquid crystal material is approximately 1.6, but a polar angle of the light actually incident to the dot can be made small by using the overcoat layer with the refractive index of approximately 1.4 to 1.8. For example, when the overcoat layer with the refractive index of 1.6 is used, and the light is made to enter the optical member at a polar angle of 45 degrees, the polar angle actually incident to the dot can be made approximately 27 degrees. Therefore, the polar angle of the light at which the optical member indicates retroreflection property can be widened by using the overcoat layer, and even in a dot with a small angle formed by the dot surface and the substrate, high retroreflection property can be obtained in a wider range. Furthermore, the overcoat layer may have functions as an antireflection layer, a sticker layer, an adhesive layer, and a hard coat layer.

Examples of the overcoat layer include a resin layer and the like obtained by applying a composition containing a monomer on the surface side of the substrate with which the dot is in contact and by curing the composition after that. The resin is not particularly limited and may be selected by considering adhesion to the substrate or the liquid crystal material forming the dot. For example, a thermoplastic resin, a thermosetting resin, an ultraviolet curable resin and the like can be used. From the viewpoint of durability, solvent resistance and the like, a resin of a type being cured by cross-linking is preferable, and particularly, an ultraviolet curable resin capable of being cured in a short time is preferable. Examples of a monomer that can be used for formation of the overcoat layer include ethyl (meth)acrylate, ethyl hexyl (meth)acrylate, styrene, methylstyrene, N-vinylpyrrolidone, polymethylol propane tri (meth)acrylate, hexanediol (meth)acrylate, tripropylene glycol di(meth)acrylate, diethylene glycol di (meth)acrylate, pentaerythritol tri (meth)acrylate, dipentaerythritol hexa (meth)acrylate, 1,6-hexanediol di(meth)acrylate, neopentyl glycol di(meth)acrylate, and the like.

A thickness of the overcoat layer is not particularly limited and may be determined in consideration of the maximum height of the dot, and may be approximately 5 to 100 µm, preferably 10 to 50 µm, and more preferably 20 to 40 µm. The thickness is a distance from the dot formation surface of the substrate of a portion without a dot to the surface of the overcoat layer on the opposing surface.

<Uses of Optical Member>

Uses of the optical member of the present invention are not particularly limited and the optical member can be used as various reflecting members.

For example, an optical member having a form in which a large number of dots are formed close to each other on the substrate surface can be used as a retroreflector reflecting only circularly polarized light of a specific wavelength.

An optical member having dots in a patterned manner can be an input medium used in combination with input means such as an electronic pen which digitalizes handwritten information and inputs the information to an information processing device by forming the pattern as, for example, a dot pattern encoded for giving positional information. In use, the liquid crystal material forming the dot is prepared and used so that the wavelength of the light radiated from the input means becomes a wavelength at which the dot indicates the reflection. Specifically, a helical pitch of the cholesteric structure may be adjusted by the above-described method.

The optical member of the present invention can also be used as an input medium such as an input sheet on the display surface of a liquid crystal display or the like. In this case, the optical member is preferably transparent. The optical member may be bonded directly to the display surface or via another film or the like and integrated with the display, or may be detachably attached to, for example, the display surface. In this case, a wavelength region of the light in which the dot in the optical member of the present invention exhibits selective reflection is preferably different from the wavelength region of the light emitted from the display. Namely, the dot preferably exhibits selective reflection property in a non-visible light region and the display preferably does not emit non-visible light so that erroneous detection does not occur in a detection device.

As to a handwriting input system which digitalizes handwritten information and inputs the information into the information processing device, Japanese Patent Laid-Open No. 2014-67398, Japanese Patent Laid-Open No. 2014-98943, Japanese Patent Laid-Open No. 2008-165385, the paragraphs [0021] to [0032] in Japanese Patent Laid-Open No. 2008-108236, Japanese Patent Laid-Open No. 2008-077451 or the like can be referred to.

As a preferred embodiment when the optical member of the present invention is used as a sheet attached to the surface or to the front of the display device capable of image display, an embodiment described in the paragraphs [0024] to [0031] in Japanese Patent No. 4725417 can be included.

Figure 2:
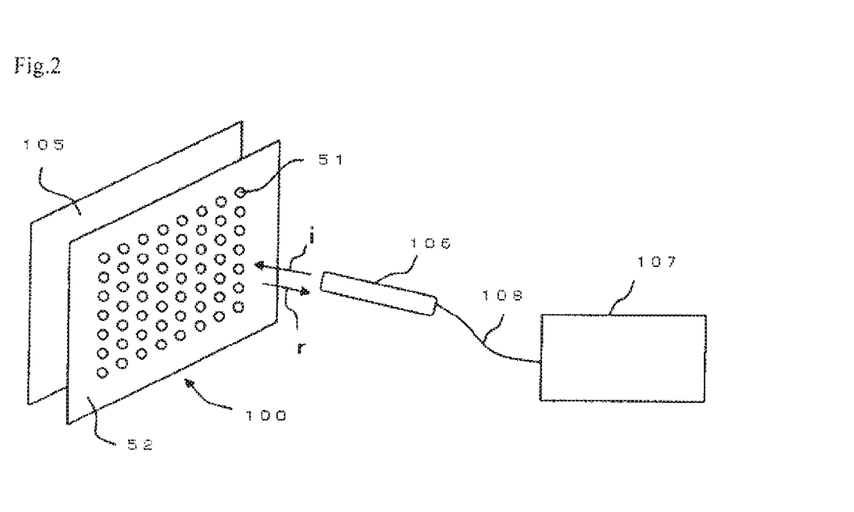
FIG. 2 is an outline view of a system using the optical member of the present invention as a sheet attached to a surface or a front of an image display device (a display device capable of displaying an image).

A schematic view of a system of using the optical member of the present invention as a sheet attached to the surface or to the front of the display device capable of image display is illustrated in FIG. 2.

As a pen-type input terminal 106 in FIG. 2, a known sensor may be used without particular limitation as long as it emits infrared light i and can detect reflected light r of the above-described pattern, and as an example in which a pen-type input terminal 106 includes a read-out data processing device 107, the one incorporating: a pen point not including ink, black lead or the like; a CMOS (Complementary Metal-Oxide Semiconductor) camera provided with an infrared irradiation portion; a processor; a memory; a communication interface such as a wireless transceiver utilizing a Bluetooth (registered trademark) technologies and the like; a battery and the like, all disclosed in Japanese Patent Laid-Open No. 2003-256137 can be exemplified.

As to an operation of the pen-type input terminal 106, for example, by bringing the pen point into contact with the front surface of the optical member 100 of the present invention and by performing drawing so as to trace the front surface, the pen-type input terminal 106 detects a pen pressure applied to the pen point, then the CMOS camera operates and irradiates a predetermined range close to the pen point with the infrared rays at a predetermined wavelength emitted from the infrared rays irradiation portion, and images a pattern (pattern imaging is performed, for example, approximately several tens to 100 times per second). When the pen-type input terminal 106 includes the read-out data processing device 107, an input trajectory along with movement of the pen point at the time of handwriting is converted into numerical values/data by analyzing the imaged pattern by a processor to thereby generate input trajectory data, and the input trajectory data is transmitted to the information processing device.

The members such as the processor, the memory, the communication interface including a wireless transceiver utilizing the Bluetooth (registered trademark) technology and the like, and the battery and the like may be outside the pen-type input terminal 106 as the read-out data processing device 107, as illustrated in FIG. 2. In this case, the pen-type input terminal 106 may be connected to the read-out data processing device 107 by a cord 108 or may transmit read-out data wirelessly by using electric waves, infrared rays and the like.

In addition, the input terminal 106 may be a reader as described in Japanese Patent Laid-Open No. 2001-243006.

The read-out data processing device 107 that can be applied in the present invention is not particularly limited as long as the device has functions of calculating positional information from the continuous imaging data read out by the input terminal 106, of combining the positional information with time information and of providing the combined information as the input trajectory data that can be handled by the information processing device, and may include members such as a processor, a memory, a communication interface, a battery and the like.

Furthermore, the read-out data processing device 107 may be built in the input terminal 106 as described in Japanese Patent Laid-Open No. 2003-256137, or may be built in the information processing device including the display device. Moreover, the read-out data processing device 107 may wirelessly transmit the positional information to the information processing device including the display device, or may transmit the information through wired connection connected by a cord or the like.

The information processing device connected to a display device 105 sequentially updates images to be displayed on the display device 105 on the basis of trajectory information transmitted from the read-out data processing device 107, and thus can display the trajectory input by handwriting with the input terminal 106 on the display device as if the trajectory is written by a pen on paper.

<Image Display Device>

The image display device of the present invention has the optical member of the present invention.

The image display device of the present invention is preferably an image display device attached to the front of the image display surface of the image display device by arranging, for example, the optical member of the present invention, on the utmost front surface of the display device or between a front surface plate for protection and a panel for display. A preferred embodiment of the image display device is described in the above-described item of uses of the optical member.

Note that a system including the image display device in which the optical member of the present invention is attached to the image display surface of the image display device or to the front of the image display surface is also included in the invention disclosed in the present description.

EXAMPLES

The present invention is specifically described below through Examples. The materials, use quantities, ratios, processing contents, processing procedures, and the like that are indicated in Examples below can be suitably modified without departing from the spirit of the present invention. Accordingly, the scope of the present invention is not limited to the specific examples given below.

Example 1

Fabrication of a Base Layer

The following composition was stirred and dissolved in a vessel maintained at 25° C. to prepare a base layer solution.

| Base layer solution (weight parts) | |
|---|---|
| Propylene glycol monomethyl ether acetate | 67.8 |
| Dipentaerythritol hexaacrylate (made by Nippon Kayaku Co., Ltd. Product name: KAYARAD DPHA) | 15.0 |
| Megafac RS-90 (made by DIC Co., Ltd.) | 26.7 |
| Irgacure 819 (made by BASF Corp.) | 0.5 |

The base layer solution prepared above was applied in a quantity of 3 mL/m² with a bar coater on a transparent PET (polyethylene terephthalate, made by Toyobo Co., Ltd., Cosmoshine A4100) substrate 100 μm in thickness. Subsequently, heating was conducted to a film surface temperature of 90° C. Following drying for 120 seconds, under a nitrogen purge with an oxygen concentration of less than or equal to 100 ppm, 700 mJ/cm² (illuminance 200 mW/cm², 3.5 seconds) of UV radiation was irradiated with a UV irradiation apparatus to promote a crosslinking reaction and fabricate an base layer.

(Forming Cholesteric Liquid Crystal Dots)

The following compositions were stirred and dissolved in a vessel maintained at 25° C. to prepare cholesteric liquid crystal ink liquids A and B (liquid crystal compositions). The chiral agent in cholesteric liquid crystal ink liquid A is right handed and the chiral agent in cholesteric liquid crystal ink liquid B is left handed

| Cholesteric liquid crystal ink liquid A (weight parts) | |
|---|---|
| Methoxyethyl acrylate | 145.00 |
| Mixture of the rod-shaped liquid crystal compounds given below | 100.0 |
| Irgacure 819 (made by BASF Corp.) | 10.0 |
| Chiral agent of the structure indicated below | 3.8 |
| Surfactant of the structure indicated below | 0.08 |

Rod-Shaped Liquid Crystal Compounds

84%

14%

2%

The numbers given above are weight %. The group denoted by R is the partial structure shown on the lower right; it is bonded at the site of the oxygen atom in the partial structure.

Chiral Agent

Surfactant

| Cholesteric liquid crystal ink liquid B (weight parts) | |
| --- | --- |
| Methoxyethyl acrylate | 145.0 |
| Mixture of the rod-shaped liquid crystal compounds given below | 100.0 |
| Irgacure 819 (made by BASF Corp.) | 10.0 |
| Chiral agent of the structure indicated below | 6.7 |
| Surfactant used in ink liquid A | 0.08 |

Chiral Agent

Cholesteric liquid crystal ink liquid A prepared above was dropped in droplets onto the 50×50 mm whole surface area with a distance between dots of 300 in and dot diameter of 17 μm, by using an inject printer (DMP-2831, made by FUJIFILM Dimatix) on the base layer on the PET substrate fabricated as set forth above. The ink liquid was dried for 30 seconds at 95° C. and then irradiated with 500 mJ/cm² (illuminance 200 mW/cm², 2.5 seconds) of UV radiation to obtain predots.

Further cholesteric liquid crystal ink liquid B prepared above was dropped in droplets onto the surface of the above prepared predots, dried for 30 seconds at 95° C. and then irradiated with 500 mJ/cm² (illuminance 200 mW/cm², 2.5 seconds) of UV radiation to form dots of dot diameter of 29 μm (refractive index 1.57), and an optical member was obtained.

(Evaluation of Dot Form and Cholesteric Structure)

Ten dots were selected randomly from the dots in the optical member obtained above, and their dot shapes were observed with a laser microscope (made by KEYENCE Corporation). The dots had average diameter of 29 μm, the average maximum height of 4.7 μm, angle of the dot surface at the dot edge portion and the base layer surface at their contact portion of 35 degrees, and continuously increasing height in the direction from the dot edge portion to the dot center. One dot positioned at the center of optical member obtained as above was cut perpendicularly with respect to the PET substrate through the surface containing the dot center and the cross-section was observed with a scanning electron microscope. Stripe pattern of bright and dark parts was observed inside the dot.

In a reflection observing system using a polarization microscope (ECLIPSE E600 POL) made by Nicon corporation, a digital camera for microscope (DXMI200), and an application software (ACT-1), the optical member obtained as above was observed by inclining 27 degrees with visible light cut by IR sharp cut filter (IR80) made by FUJIFILM corporation, retroreflected light was observed.

(Forming Over Coat Layer)

The following composition was stirred and dissolved in a vessel maintained at 25° C. to prepare an over coat coating liquid.

| Over coat coating liquid (weight parts) | |
| --- | --- |
| Acetone | 100.0 |
| Kayarad DPCA-30 (made by Nippon Kayaku Co., Ltd) | 100.0 |
| Irgacure 819 (made by BASF Corp.) | 3.0 |

The over coat coating liquid prepared above was applied in a quantity of 80 mL/m² with a applicator on the base layer on which the cholesteric liquid crystal dots had been formed. Subsequently, heating was conducted to a film surface temperature of 50° C., drying was conducted for 60 seconds, and 700 mJ/cm² of UV radiation was irradiated with a UV irradiation apparatus to promote a crosslinking reaction and prepare an over coat layer (refractive index 1.52).

(Evaluation of Dot Performance)

With respect to the optical member having the overcoat layer that was prepared above, five parts of an eyesight of diameter of 2 mm were randomly measured by using a light source for irradiation of visible-near infrared light (HL-2000) made by Ocean Optics, Inc., ultra high resolution fiber multi-channel spectrometer (HR4000), and bifurcated optical fiber. In the eyesight of every part, the reflection peak wavelength was 850 nm, retroreflection was observed in every dot, whenever the dot is observed in the range of polar angle of 0 to 50 degrees while setting the normal line of the optical member as 0 degree.

Further, with respect to the optical member having the overcoat layer that was prepared above, observation was conducted in a reflection observing system using a polarization microscope (ECLIPSE E600 POL) made by Nicon corporation, digital camera for microscope (DXMI200), and application software (ACT-1) with visible light cut by IR sharp cut filter (IR80) made by FUJIFILM corporation.

First, to determine the direction (right or left) of circularly polarized light that was reflected, a λ/4 plate that was an accessory of the polarization microscope was inserted and observation was conducted with the angle of the analyzer at 0 degree and 90 degrees to determine whether the reflected light was circularly polarized light of the both directions or circularly polarized light of one direction.

Further, by changing exposure time in the application software (ACT-1), the exposure time with which reflection of the dot can be observed and ranking was carried out based on the following evaluation standard. The shorter exposure time means stronger reflection intensity. When the reflected circularly polarized light and the exposure time were determined, determination in the condition where the sample was inclined by 45 degrees in addition to the condition where light is observed in front of the sample was conducted.

A: Observable with exposure time of 1/50 seconds;
B: Observable with exposure time of 1/40 seconds (not observable with exposure time of 1/50 seconds);
C: Observable with exposure time of 1/30 seconds;
D: Observable with exposure time of 1/20 seconds;
E: Observable with exposure time of 1/15 seconds;
F: Observable with exposure time of 1/12 seconds;
G: Observable with exposure time of 1/6 seconds.

Examples 2 to 9 and Comparative Examples 1, 2

Optical members having the overcoat layers were prepared in the same manner as that of Example 1, except the order of using the cholesteric liquid crystal ink liquid, DHPA quantity in the base layer solution, and inkjet dot diameter were changed as shown in the table below.

The results of the measurements of dot diameter, maximum height/diameter, reflected circularly polarized light, and exposure time observable are shown below.

TABLE 1

| | Order of ink liquid | DHPA quantity in the solution of the under layer (weight part) | Diameter (μm) | Maximum height/ diameter | Angle of dot surface of edge portion and substrate (degree) | Retro- reflection at 27 degree inclination | Reflected circularly polarized light obsereved (frontal) | Reflected circularly polarized light obsereved (45 degree inclination) | Exposure time observable from front | Exposure time observable in 45 degree inclination |
|---|---|---|---|---|---|---|---|---|---|---|
| Example1 | A→B | 15 | 29 | 0.16 | 35 | Observed | R and L | R and L | B | C |
| Example2 | A→B | 15 | 40 | 0.16 | 35 | Observed | R and L | R and L | A | B |
| Example3 | A→B | 15 | 80 | 0.17 | 37 | Observed | R and L | R and L | A | A |
| Example4 | A→B | 15 | 109 | 0.18 | 41 | Observed | R and L | R and L | A | A |
| Example5 | A→B | 15 | 137 | 0.21 | 45 | Observed | R and L | R and L | A | A |
| Example6 | A→B | 5 | 70 | 0.25 | 53 | Observed | R and L | R and L | A | A |
| Example7 | A→B | 5 | 96 | 0.27 | 58 | Observed | R and L | R and L | A | A |
| Example8 | A→B | 5 | 122 | 0.30 | 62 | Observed | R and L | R and L | A | A |
| Example9 | B→A | 15 | 80 | 0.17 | 37 | Observed | R and L | R and L | B | C |
| Comparative Example1 | Only A | 15 | 80 | 0.13 | 29 | Not observed | Only R | Only R | D | F |
| Comparative Example2 | Only B | 15 | 80 | 0.13 | 29 | Not observed | Only L | Only L | E | G |

R: Right,
L: Left

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

1 Dot
2 Substrate
3 Support
4 Base layer
5 Overcoat layer
100 Optical member
105 Display device
106 Pen-type input terminal
107 Read-out data processing device
108 Cord

What is claimed is:

1. An optical member comprising a substrate and a dot in contact with a surface of the substrate,
   wherein the dot comprises a liquid crystal material having a cholesteric structure;
   wherein the dot has wavelength selective reflection property;
   wherein the dot reflects both the right circularly polarized light and the left circularly polarized light at a wavelength at which the dot exhibits the wavelength selective reflection property;
   wherein the dot reflects both the right circularly polarized light and the left circularly polarized light to both incident light with an angle relative to a normal line of the substrate of 0 degrees and incident light with an angle relative to the normal line of the substrate of 27 degrees;
   wherein the dot is circular when seen from the normal direction of the substrate; and
   wherein the dot includes a portion having a height continuously increasing from an edge portion of the dot to a maximum height in a direction toward the center.

2. The optical member according to claim 1, wherein cholesteric structure comprises a cholesteric structure with a right helical twist direction and a cholesteric structure with a left helical twist direction.

3. The optical member according to claim 2,
wherein the dot comprises a portion comprising the cholesteric structure with the right helical twist direction and the cholesteric structure with the left helical twist direction, in a layered state in this order, from the substrate side in a direction of the normal line of the substrate, the substrate and the cholesteric structure with the right helical twist direction are in direct contact with each other, and the cholesteric structure with the right helical twist direction and the cholesteric structure with the left helical twist direction are in direct contact with each other.

4. The optical member according to claim 3, comprising a plurality of the dots in a patterned manner on the surface of the substrate.

5. The optical member according to claim 4,
wherein the dot has a wavelength selective reflection property having a central wavelength in an infrared light region.

6. The optical member according to claim 5, which is transparent.

7. An image display device comprising the optical member according to claim 6.

8. The optical member according to claim 3,
wherein the liquid crystal material is a material obtained by curing a liquid crystal composition containing a liquid crystal compound and a chiral agent.

9. The optical member according to claim 3,
wherein the dot has a wavelength selective reflection property having a central wavelength in an infrared light region.

10. The optical member according to claim 9, which is transparent.

11. The optical member according to claim 1, comprising a plurality of the dots in a patterned manner on the surface of the substrate.

12. The optical member according to claim 1,
wherein a diameter of the dot is 20 to 200 μm.

13. The optical member according to claim 1,
wherein a diameter of the dot is 70 to 150 μm.

14. The optical member according to claim 1,
wherein a value obtained by dividing a maximum height of the dot by the diameter of the dot is 0.16 to 0.30.

15. The optical member according to claim 1,
wherein an angle formed by a surface of the dot and the substrate is 33 to 62 degrees on an edge portion of the dot.

16. The optical member according to claim 1,
wherein the dot has a wavelength selective reflection property having a central wavelength in an infrared light region.

17. The optical member according to claim 16,
wherein the dot has a wavelength selective reflection property having a central wavelength in a wavelength of 800 to 950 nm.

18. The optical member according to claim 1, which is transparent.

19. An image display device comprising the optical member according to claim 18.

20. The optical member according to claim 1,
wherein the dot includes a cholesteric structure having a right helical twist direction and a cholesteric structure having a left helical twist direction, and
wherein one cholesteric structure is positioned at a part that contacts the surface of the dot and on the inward side on the one cholesteric structure the other cholesteric structure is positioned.

* * * * *